United States Patent [19]

Rose

[11] Patent Number: 5,076,915
[45] Date of Patent: Dec. 31, 1991

[54] APPARATUS FOR REMOVING SUSPENDED SOLIDS FROM A LIQUID

[75] Inventor: Phillip R. Rose, Pleasant Hill, Calif.

[73] Assignee: Chevron Research Company, San Francisco, Calif.

[21] Appl. No.: 541,447

[22] Filed: Jun. 22, 1990

Related U.S. Application Data

[60] Continuation of Ser. No. 388,340, Jun. 14, 1982, abandoned, which is a division of Ser. No. 231,531, Feb. 4, 1981, abandoned, which is a continuation of Ser. No. 128,202, Mar. 7, 1980, abandoned, which is a continuation of Ser. No. 945,756, Sep. 25, 1978, abandoned.

[51] Int. Cl.$^5$ ............................................. C02F 1/40
[52] U.S. Cl. ................................... 210/197; 210/537; 210/540
[58] Field of Search ............... 210/800, 801, 803–805, 210/197, 532.1, 534, 537, 540, 190, 207

[56] References Cited

U.S. PATENT DOCUMENTS

| | | | |
|---|---|---|---|
| 2,699,374 | 1/1955 | Lugre | 210/197 X |
| 3,236,384 | 2/1966 | Sontheimer et al. | 210/197 |
| 3,306,449 | 2/1967 | Minegishi | 210/197 X |
| 3,353,670 | 11/1967 | Hirsch | 210/197 |
| 4,075,080 | 2/1978 | Gorin | 210/800 |

Primary Examiner—Thomas Wyse
Attorney, Agent, or Firm—J. W. Ambrosius

[57] ABSTRACT

Disclosed is a gravity settler for separating finely divided solids such as coal fines from a liquid such as a mixture of coal oil and agglomerating agent by agglomeration. A feed slurry comprising finely divided solids and a liquid mixture of product oil and an agglomerating agent is discharged into a specially shaped duct which promotes formation of agglomerated solids while minimizing turbulence in the remainder of the vessel. The agglomerated solids separate from the liquid by gravity and are washed as they leave the settler while the clarified liquid is discharged from the top of the settler. A method for separating suspended solids from a liquid by agglomeration is also disclosed.

4 Claims, 2 Drawing Sheets

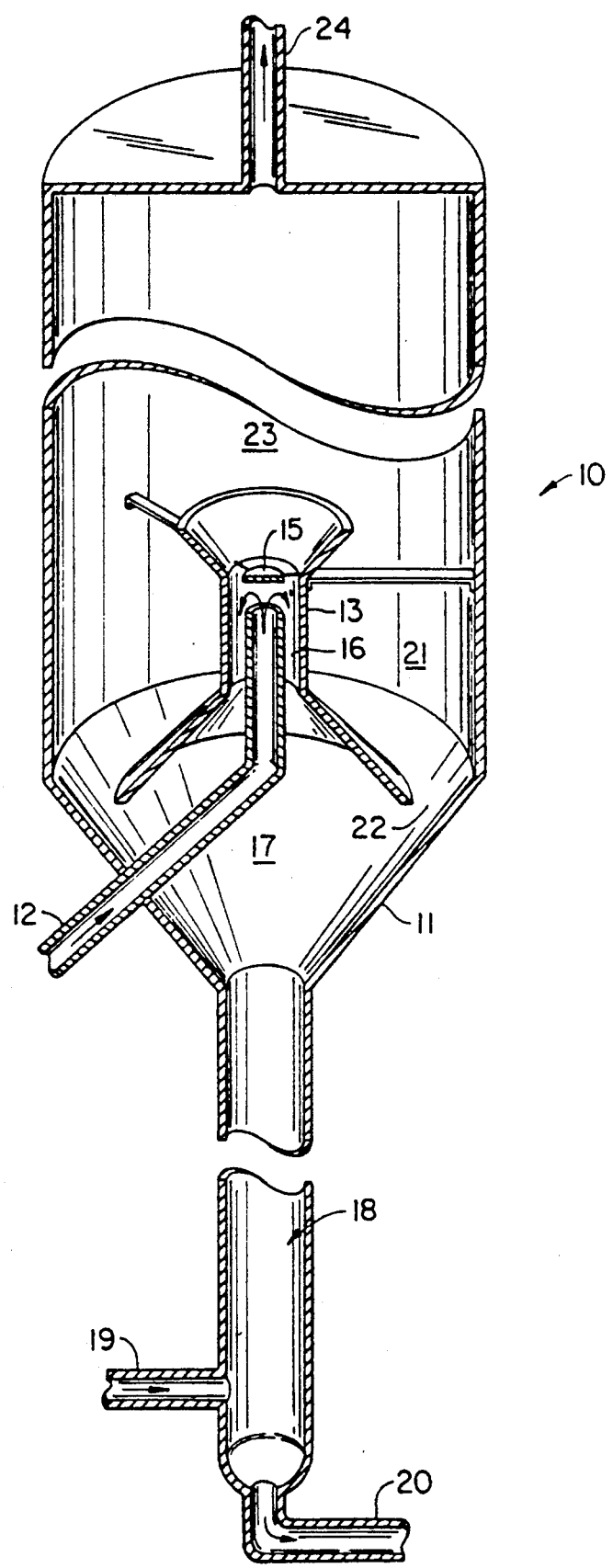
FIG._1.

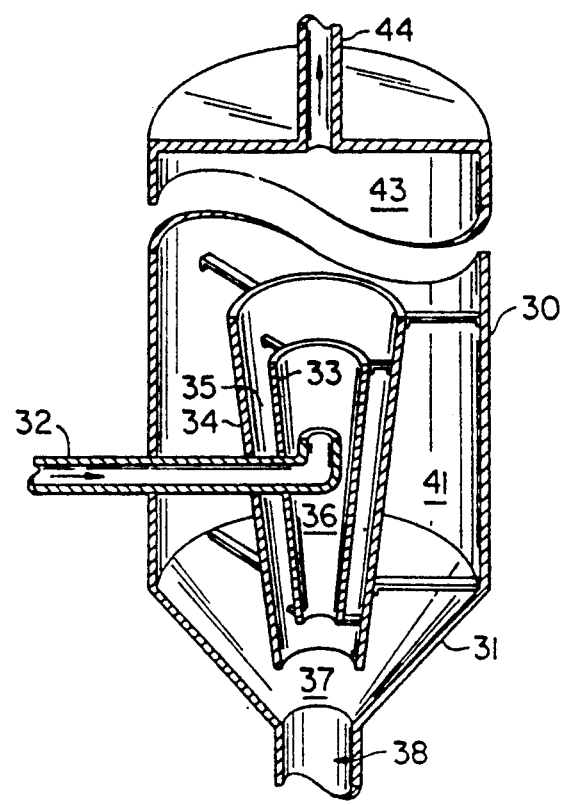
FIG._2.
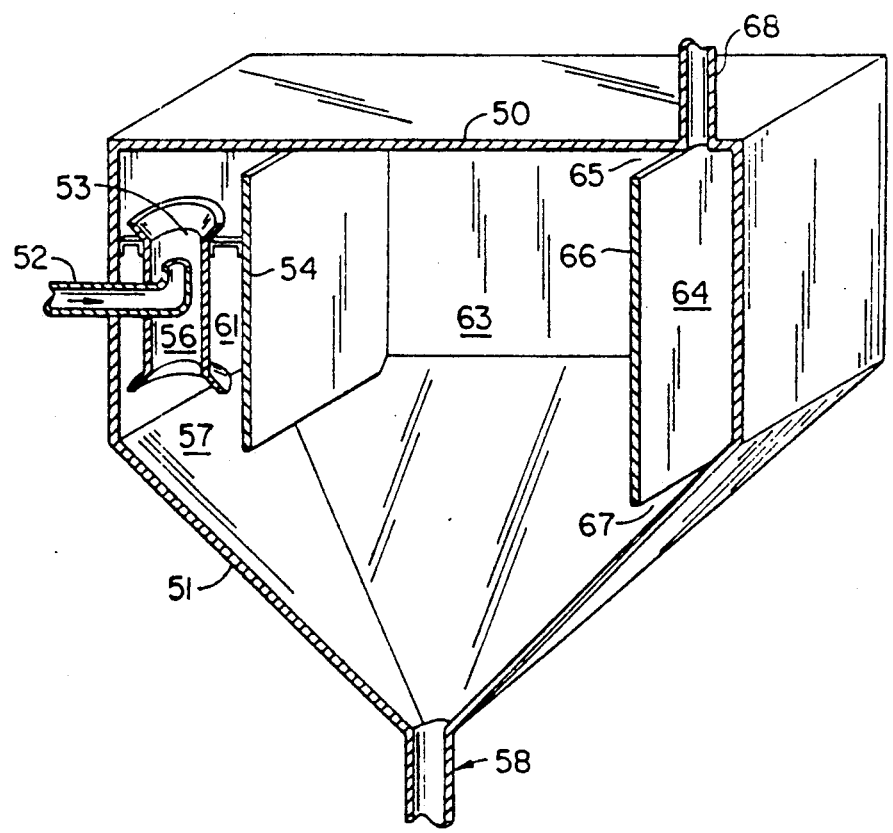
FIG._3.

APPARATUS FOR REMOVING SUSPENDED SOLIDS FROM A LIQUID

This application is a continuation of application Ser. No. 388,340 filed June 14, 1982, now abandoned, which is a division of my copending application Ser. No. 231,531, filed Feb. 4, 1981, now abandoned, which is, in turn, a continuation of my copending application Ser. No. 128,202, filed on Mar. 7, 1980, now abandoned, which is, in turn, a continuation of my copending application Ser. No. 945,756, filed on Sept. 25, 1978, and now abandoned.

BACKGROUND OF THE INVENTION

This invention relates to a gravity settling apparatus and method for recovering a clarified liquid from a slurry comprising a liquid and suspended solids. In a particular aspect, the invention relates to the design of internals for a gravity settler.

The need for an effective and economical apparatus and method for removing suspended solids from a liquid slurry containing them is a continuing problem in the field of solid-liquid separation. The need is especially noticeable in the case of synthetic hydrocarbon liquid processing, such as coal liquefaction, tar-sand oil extraction and shale pyrolysis. Coal liquefaction extracts, shale oils and the like usually contain appreciable amounts of finely divided suspended solids. These solids can seriously interfere with catalytic processing for upgrading these oils to useful fuels due to catalyst deactivation by poisoning active sites, pore plugging, reactor plugging, etc. Typically, all suspended, finely divided solids have average diameters in the range below 100 microns.

These solids are commonly described in the art as unfilterable because, as a practical matter, satisfactory separation of them from the oil cannot be accomplished by usual mechanical separation techniques such as filtering, centrifuging and settling. Gravity settlers are used to separate solids from a slurry of the solids and the liquid, and they are especially useful in the application of separating coal oil from coal fines and ash. Examples of conventional gravity settlers include the following:

U.S. Pat. No. 4,075,080, which describes a process for separating undissolved solids from coal oil. The gravity settler described therein has a settling zone above a washing zone in which descending agglomerated solids are washed before they are withdrawn.

U.S. Pat. No. 3,791,956, which describes a settler comprising an upper quiet zone and a lower agitated zone. The feed is discharged downwardly into a central vessel, clarified liquid is withdrawn from an edge of the quiet zone, and solids are withdrawn from the bottom of the agitated zone.

U.S. Pat. No. 4,096,051, which describes a separator having a central attrition zone surrounded by a sand separation zone and an outer product recovery zone.

Settlers incorporating other arrangements of internals are shown in U.S. Pat. Nos. 3,184,065 and 1,104,051. In spite of the long history of the use of gravity settlers, there is still room for improvement in their design.

SUMMARY OF THE INVENTION

The present invention is an apparatus and a process for separating a clarified liquid from a slurry of a liquid and suspended solids. In accordance with one embodiment of this invention, there is provided a gravity settler for settling suspended solids from a slurry of a liquid and said solids, comprising in combination:

(a) a vessel containing a settling zone in an upper portion thereof;

(b) at least one duct open at the top and bottom portions within said vessel and spaced apart from the sides thereof, said duct having a vertically extending portion, defining with the bottom portion of said vessel a separating zone below said duct and in communication with the interior thereof and with said settling zone, and defining with a side portion of said vessel a passageway so adapted and arranged as to permit circulation of a portion of a partially settled liquid from said separating zone upwardly into the upper end of said duct, whereby incoming slurry within the duct is mixed with downflowing partially settled liquid circulated into the duct from the separating zone;

(c) slurry inlet means discharging upwardly into the interior of said duct;

(d) settled solids removal means located in a lower portion of said vessel; and (e) clarified liquid removal means located in an upper portion of said settling zone.

In accordance with a preferred embodiment of the invention, the settler is a vertically elongated vessel and the duct is an intermediate portion thereof. Alternatively, the settler can be a horizontally extending vessel, and within the vessel a first baffle is positioned to one side across a portion of the vessel and a side zone in the smaller resulting portion of the vessel, said duct being spaced apart from the baffle and defining with the baffle and side portion of the vessel said passageway.

In accordance with another embodiment of the present invention, there is provided a method for separating a clarified liquid comprising a product and an agglomerating agent from a slurry of said liquid and suspended solids wherein said slurry is charged to a settling zone and held there to allow said solids to agglomerate and separate by gravitation, a clarified and essentially solids-free liquid is recovered from an upper portion of said settling zone, and settled agglomerated solids are withdrawn from a lower portion of said vessel, wherein the improvement comprises:

(1) discharging said slurry upwardly into a mixing zone within an intermediate or upper portion of said vessel;

(2) forming within said mixing zone a mixture of said slurry with a downflowing recirculated liquid stream;

(3) forming from said mixture a first portion of agglomerated solids of a size large enough to settle by gravitation and a partially settled liquid by circulating said mixture downwardly into a separating zone positioned below said mixing zone and separating said first agglomerate portion from said mixture by gravitation;

(4) forming from said partially settled liquid a second portion of agglomerated solids of a size large enough to settle by gravitation and a further settled liquid by circulating at least a portion of said partially settled liquid upwardly through a quiet zone horizontally surrounding said mixing zone and there separating said second agglomerate portion from said further settled liquid by gravitation;

(5) providing at least a portion of said recirculated liquid stream by circulating at least a portion of said further settled liquid from said quiet zone into said mixing zone;

(6) circulating to said settling zone a portion of one of the following:

said partially settled liquid from said separating zone and said further settled liquid from said quiet zone.

DESCRIPTION OF THE FIGURES

FIG. 1 is a vertical sectional view through a settler having a spool-shaped duct in accordance with a preferred embodiment of the invention.

FIG. 2 is a vertical sectional view through a settler having two ducts formed by two concentric truncated cones in accordance with another preferred embodiment of the invention.

FIG. 3 is a vertical sectional view through a settler having a settling zone positioned horizontally with respect to a spool-shaped duct, in accordance with still another preferred embodiment of the invention.

DETAILED DESCRIPTION OF THE INVENTION

The settler of the present invention is particularly useful in settling finely divided suspended solids from a slurry of the solids in a liquid. In particular, the settler is useful in removing unfilterable suspended solids from a slurry of the solids and a hydrocarbonaceous liquid and especially a hydrocarbonaceous oil which is partially or completely undistillable. Effective removal of finely divided solids from hydrocarbonaceous oils enables one thereafter to more easily catalytically upgrade the oil, because prior distillation, which may involve a substantial loss of desirable product precursors with the rejected solids, is no longer necessary.

As used herein, a "slurry" is a mixture comprising a liquid and unfilterable suspended solids. The liquid may be any liquid or liquid mixture, aqueous or organic, and preferably comprises a mixture of hydrocarbonaceous oil and agglomerating agent.

As used herein, "unfilterable suspended solids" means finely divided solids having an average diameter below about 100 microns. Such solids suspend readily in liquids, especially in unrefined synthetic oils. Separation from the oil of these minutely sized solids by ordinary techniques is not satisfactory in a practical economic sense, because they readily obstruct the filter medium and do not settle upon standing.

The term "nondistillable hydrocarbonaceous liquid" (or "oil") as used herein refers to an oil which cannot be distilled without decomposing or cracking, such as coal liquefaction extract, shale oils and the like. Such oils typically contain appreciable amounts (at least 5 weight percent) of one or more components which under ordinary distillation conditions thermally crack or polymerize to form unsatisfactory degradation products such as coke. Finely divided suspended solids in general are effectively removed from the oil by the apparatus and method of the invention.

Representative solids include mineral ash-forming impurities, solid coal, coke, carbonaceous solids, catalyst fines, solid oil shale and spent shale fines, tar-sand solids such as clay and sand, natural and synthetic mineral oxides, organic and inorganic salts, mixtures thereof, and the like, in particulate form, particularly the finely divided solids having an average diameter below about 100 microns and especially below 60 microns.

Representative solids-containing hydrocarbonaceous oils suitable for treatment by the present apparatus include shale-derived oil, coal liquefaction oils such as from extraction, hydrogenation, pyrolysis or other thermal treatment, and combinations of them; tar-sand-derived oils; petroleum refinery decant oils such as fractionator bottom oils from a fluid catalytic cracking process, bottoms fractions of said oils and oils containing coke fines; mixtures of any two or more of the above; and the like oils. Nondistillate hydrocarbonaceous liquids are preferred feeds, and coal-derived oils are especially preferred.

The slurries suitable as feedstocks for the apparatus and process of the present invention may contain, in addition to unfilterable suspended solids, larger, but still finely divided particulate filterable solids, e.g., smaller than 200 microns. The total of solid components should represent from at least 0.1 weight percent to as much as 60 weight percent or more, and preferably from 1 to 50 weight percent, of the solids-coal oil slurry. Especially preferred feedstocks have a finely divided solids content in the range from 5 to 40 weight percent of the solids-oil slurry.

The liquid portion of the feedstock to the apparatus in the process of the present invention may also contain an agglomerating agent. Examples of suitable agglomerating agents are given in my copending application Ser. No. 914,882, filed June 12, 1978, which is incorporated herein by specific reference thereto. An especially useful agglomerating agent comprises a mixture of ketones and especially a mixture of acetone and 2-butanone in a proportion of at least 0.1 volume and not more than 1.0 volume of 2-butanone for each volume of acetone. Preferred volumetric ratios of agglomerating agent to oil are from 0.05 to 3.

Agglomeration conditions for use in the process of the invention will vary depending upon such process factors as the type and solids content of the slurry, the size distribution of the solids and the properties of the liquids being processed. Representative conditions are described in my U.S. Pat. No. 4,094,770, issued June 13, 1978, and incorporated herein by specific reference thereto. In general, the most satisfactory process temperature will range from 20° to 160° C., and satisfactory pressures will depend upon the temperatures employed and may vary from 1 to 50 atmospheres absolute, and preferably from 1 to 5 atmospheres. For removing solids from a coal oil, the preferred conditions are a temperature from 80° to 160° C., more preferably from 120° to 160° C., and a pressure from 2 to 5 atmospheres.

The use of a washing zone is a preferred embodiment of the present invention, even though in some applications the use of a washing zone may not be desirable or practical. However, should a washing zone be employed, it will preferably be operated at a temperature and pressure approximately the same as those for the settler.

The present invention stems from the discovery that agglomerated solids are very fragile and that disturbance or agitation of the liquid within the settler should be minimized to reduce breakup of the agglomerated solids. The duct surrounding an upwardly discharging inlet divides the separator into a number of zones. These zones promote agglomeration of the suspended solids while minimizing disturbance of the contents of the remainder of the vessel.

The Figures and Example will be discussed from the standpoint of the preferred embodiment of separating coal fines and ash from a liquid comprising coal oil and agglomerating agent.

Referring to FIG. 1, there is shown settler 10 having a converging bottom portion 11. The feed slurry to the settler enters through line 12 and comprises a mixture of a coal oil containing suspended solids and an agglomerating agent.

The slurry is discharged upwardly within spool-shaped vertically oriented duct 13. Because the slurry is denser than the recirculated partially clarified liquid (specific gravity 1.04 vs. 0.99), upon being discharged into the duct, the slurry will reverse direction of flow and begin to flow downwardly. As it flows downwardly, the slurry mixes with a recycle portion of further settled liquid entering the duct 13 through an upper opening therein. Deflector 15 prevents the feed from agitating the clarified liquid above the duct, and duct 13 prevents disturbance of the contents of the vessel alongside the inlet. The mixture of feed and further settled liquid circulates downwardly from mixing zone 16 through a diverging section of the duct and into separating zone 17. The diverging section acts to decrease the downward velocity of the mixture. In zone 17, a portion of the suspended solids in the mixture agglomerates and separates by gravitation. Agglomerated solids from separating zone 17 and other zones are collected by downwardly converging bottom portion 11 and passed into washing zone 18. In washing zone 18, occluded product liquid is washed from the down-flowing agglomerated solids with an upflowing washing liquid that is introduced into a lower portion of the washing zone through line 19. The washing liquid should be a solvent for the clarified liquid and is preferably an agglomerating agent, and more preferably the same agglomerating agent that is present in the feedstock. The washed agglomerated solids are removed from the bottom of washing zone 18 via line 20.

After a portion of solids has agglomerated and separated from the mixture in separating zone 17, the resulting mixture, partially depleted of solids, is mixed with upflowing washing liquid from washing zone 18 and circulated into quiet zone 21. Further agglomeration occurs in quiet zone 21, and agglomerated solids settle downwardly through opening 22, are collected on bottom portion 11, and are passed to washing zone 18. Opening 22 is sized so that the velocity of the upflowing liquid is less than the terminal velocity of the settling agglomerated solids.

The further settled liquid, further depleted of solids, is circulated upwardly from quiet zone 21. A portion of the liquid is circulated to the upper opening of the duct as the partially clarified recycle liquid which is admixed with the incoming slurry. Recycling a portion of the further settled liquid allows still more of the solids suspended in it to agglomerate and separate from the liquid. The remaining portion of the further settled liquid from quiet zone 21 is circulated upwardly into settling zone 23. Settling zone 23 is of sufficient size to provide a residence time and liquid velocity suitable to allow the remaining solids to agglomerate and separate by gravity. Generally, the residence time required for liquids in the settling zone will be at least 1 minute, preferably from 2 to 60 minutes, and still more preferably from 2 to 5 minutes. Clarified liquid is withdrawn from the top of settling zone 23 via line 24. Agglomerated solids from settling zone 23 settle by gravity through quiet zone 21 or mixing zone 16 before they are removed from the settler.

Another embodiment of the apparatus of the present invention is illustrated in FIG. 2.

Referring now to FIG. 2, there is shown a gravity settler 30 having two ducts in the form of a pair of concentric cones 33 and 34 which have the base uppermost. The feed is discharged upwardly through inlet 32, changes direction to flow downwardly and is mixed with a recycle portion of liquid which enters mixing zone 36 from above. A portion of the solids agglomerates and continues to settle downwardly in separating zone 37 onto converging bottom portion 31. The collected agglomerates are then passed into washing zone 38 and are there handled as described in connection with FIG. 1. A portion of the partially settled liquid from separating zone 37 is circulated upwardly into annular space 35 between truncated cones 33 and 34, and then is recycled into mixing zone 36.

The remaining portion of partially settled liquid from separating zone 37 is mixed with washing solvent from washing zone 38 and circulated upwardly into quiet zone 41. Further agglomeration takes place in the quiet zone. Agglomerated solids settle onto converging bottom portion 31, and the partially settled liquid circulates upwardly from quiet zone 41. A portion of the liquid from the quiet zone is circulated into mixing zone 36, and the remaining portion is circulated to settling zone 43. Further agglomeration of solids occurs in settling zone 43, and a clarified liquid is withdrawn via outlet 44.

Yet another embodiment of the settler of the present invention is shown in FIG. 3.

Referring now to FIG. 3, there is shown a gravity settler 50 having a converging bottom portion 51 for collecting agglomerated solids. Slurry inlet means 52 discharges upwardly within the duct defined by spool-shaped wall 53. Baffle 54 minimizes disturbance of the remainder of the contents in the settler. In mixing zone 56, further settled liquid entering from the top is mixed with the feed slurry and the resulting mixture is circulated to separating zone 57, where a portion of the solids agglomerate and settle by gravity onto converging bottom portion 51 of the settler. A portion of the resulting partially settled liquid, partially depleted solids, circulates from separating zone 57 upwardly into quiet zone 61, where more solids agglomerate and settle by gravitation. The resulting further settled liquid is then circulated over the top of duct 53 and into mixing zone 56, where it is mixed with the feed slurry.

The remaining portion of partially settled liquid from separating zone 57 is circulated under baffle 54 to settling zone 63. More of the solids agglomerate and settle by gravitation to collect on converging bottom portion 51 and then are passed into washing zone 58. The partially clarified liquid from settling zone 63 is circulated to withdrawal zone 64 through passageway 65, located above baffle 66. Baffle 66 minimizes possible agitation of the contents of withdrawal zone 64. Substantially all of the remaining solids in the liquid agglomerate and separate from the liquid in zone 64. The agglomerated solids settle by gravitation to converging portion 51 of the settler, and pass out of withdrawal zone 64 through passageway 67 under baffle 66. Clarified liquid is removed from withdrawal zone 64 via outlet 68.

EXAMPLE

The following illustrative example was carried out using a glass settler of the design depicted in FIG. 1. The settler was 7.6 cm in diameter and 34 cm high, 4 cm of which is taken up by the converging bottom portion. The washing zone has a 1 cm diameter and extends 8 cm below the bottom of the settler. The spool was 5.4 cm long with the barrel portion taking 4.4 cm of that. The barrel of the spool was 1.25 cm in diameter, the top was flared to 2.5 cm in diameter, and the bottom was flared to 6.3 cm in diameter. The settler was initially filled with a clear liquid so that the flow of the slurry could be observed. A feed slurry comprising a mixture of equal parts coal oil containing suspended solids and agglomerating agent was passed upwardly into the center of duct 13 at 400 cc/min, providing an average liquid residence time in the settler of less than four minutes. The feed slurry had the following analysis:

Coal oil + suspended solids = 50 wt. % of slurry.
Specific gravity—coal oil & suspended solids = 1.04.
Coal oil: IBP = 149° C. BP = approximately 538° C.
Solids = 30 wt. % of weight of coal oil + solids. Particle size distribution: 1 to 60 microns. Median particle size: 5 microns
Composition: A mixture of inorganic and organic solids including one or more of ash, residual coal, partially hydrogenated coal, metal oxides, sulfides and the like.
Agglomerating agent = 50 wt. % of slurry. 2-Butanone = 12.5 vol. %. Acetone = 37.5 vol. %.

The contents of the settler were maintained at room temperature and atmospheric pressure. However, the preferred temperature is from 80° to 160° C. and the preferred pressure is from 1 to 5 atmospheres, absolute. The optimum conditions are discussed in more detail in my copending application U.S. Ser. No. 914,822, filed June 12, 1978, relevant portions of which are incorporated herein by reference.

The feed was discharged upwardly into the center of duct 13, but reversed directions and flowed downwardly through mixing zone 16 while mixing with downflowing liquid from the settling zone. A sample taken at midspool contained "Y" or "T" shaped chains of agglomerated solids from 10 to 30 microns long, made of particles less than 1 micron in size. Agglomerated particles settle onto the sloped surfaces of the duct (and onto the downwardly tapered bottom portion of the vessel) where they contact each other, often sticking together to increase in size or losing their charges (which facilitates further agglomeration).

The resulting mixture circulated downwardly into separating zone 17. In the separating zone, solids agglomerated to form particles which were from 20 to 30 microns in size, and these particles settled by gravitation into washing zone 18. The size of the particles affects their residence time, and the particles should agglomerate to a size sufficiently large, e.g., above 10 microns in size, for settling to take place in minutes rather than hours. In the washing zone, the agglomerated solids were washed by a stream of agglomerating agent having the same composition as is in the feed. The washing stream flowed upwardly at 40 cc/min. The partially settled liquid from separation zone 17 mixed with the agglomerating agent from the washing zone and the resulting mixture, which contained solids under 10 microns in size, was circulated to quiet zone 21. More agglomerates formed in the quiet zone and settled by gravitation, and the resulting further settled liquid circulated out the top of the quiet zone. A portion of the further settled liquid circulated to the mixing zone, and the remaining portion circulated upwardly to the settling zone. A sample taken of the liquid 1¼ cm above the spool contained agglomerates 10 to 30 microns in size. Samples taken of the clarified liquid effluent from the settler and of the liquid 9 cm below the top of the settling zone were both free of solids over 0.5 micron in size, and contained less than 0.05 weight percent solids. The clarified liquid had a specific gravity of 0.99. The particles discharged from the washing zone were analyzed and found to contain less than 0.05 weight percent coal oil.

Thus, the gravity settler of the present invention can be used to separate suspended solids from a slurry of said solids and a liquid, to produce a clarified liquid containing less than 0.1 weight percent solids, and preferably less than 0.01 weight percent solids.

Other embodiments of the invention will be apparent to those skilled in the art from a consideration of this specification or practice of the invention described therein. It is intended that the specification and examples be considered as exemplary only, with the true scope and spirit of the invention being indicated by the following claims.

What is claimed is:

1. A gravity settler for settling finely divided suspended solids from a slurry of a liquid hydrocarbonaceous oil and said solids, comprising in combination:
    (a) a vessel containing a settling zone in an upper portion thereof, and a bottom portion which is downwardly tapered;
    (b) at least one duct open at the top and bottom portions within said vessel and spaced apart from the sides thereof, said duct having a vertically extending portion, defining with the bottom portion of said vessel a separating zone below said duct and in communication with the interior thereof and with said settling zone, and defining with a side portion of said vessel a passageway so adapted and arranged as to permit circulation of a portion of a partially settled liquid hydrocarbonaceous oil circulated into the duct from the separating zone;
    (c) slurry inlet means discharging upwardly into the interior of said duct;
    (d) settled solids removal means located in a lower portion of said vessel;
    (e) clarified liquid hydrocarbonaceous oil removal means located in an upper portion of said settling zone; and
    (f) a vertically elongated washing zone positioned below and in fluid communication with said tapered bottom portion, said washing zone having an opening at the top for permitting entry of said settled solids from said settler and exit of a washing liquid into said settler, means for introducing said washing liquid into a lower portion of said washing zone and means for removing the resulting washed solids from the lower end of said washing zone.

2. The settler of claim 1 further comprising means positioned above said inlet means for downwardly deflecting upflowing slurry.

3. A gravity settler for settling finely divided suspended solids from a slurry of a liquid hydrocarbonaceous oil and said solids, comprising in combination:
    (a) a vertically elongated vessel containing a settling zone in an upper portion thereof, and a bottom portion which is downwardly tapered;
    (b) at least one duct open at the top and bottom portions, located in an intermediate portion of said vessel and spaced apart from the sides of said vessel, said duct having a vertically extending portion and defining with the bottom portion of said vessel a separating zone below said duct and in communication with the interior thereof and with said settling zone, and defining with a side portion of said vessel a passageway so adapted and arranged as to accommodate circulation of a portion of partially settled liquid hydrocarbonaceous oil from said separating zone upwardly into the upper end of said duct;

(c) slurry inlet means discharging upwardly into the interior of said duct, whereby said slurry is mixed with downflowing partially settled liquid hydrocarbonaceous oil;

(d) settled solids removal means located in a bottom portion of said vessel;

(e) clarified liquid hydrocarbonaceous oil removal means located in an upper portion of said settling zone; and (f) a vertically elongated washing zone positioned below and in fluid communication with said tapered bottom portion, said washing zone having an opening at the top for permitting entry of said settled solids from said settler and exit of a washing liquid into said settler, means for introducing said washing liquid into a lower portion of said washing zone and means for removing the resulting washed solids from the lower end of said washing zone.

4. The settler of claim 3, further comprising means positioned above said inlet means for downwardly deflecting upflowing slurry.

* * * * *